United States Patent
Coonrad et al.

(10) Patent No.: US 11,151,061 B1
(45) Date of Patent: Oct. 19, 2021

(54) KEYBOARD HAVING REMAPPING AND ADMINISTRATIVE FUNCTIONS

(71) Applicant: Logitech Europe S.A., Lausanne (CH)

(72) Inventors: Andrew Coonrad, Newark, CA (US); Jacob Kottage, Newark, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/913,217

(22) Filed: Jun. 26, 2020

(51) Int. Cl.
*G06F 13/10* (2006.01)
*G06F 3/01* (2006.01)

(52) U.S. Cl.
CPC ............ *G06F 13/102* (2013.01); *G06F 3/016* (2013.01)

(58) Field of Classification Search
CPC ................................ G06F 13/102; G06F 3/016
USPC ............................................................ 710/67
See application file for complete search history.

(56) References Cited

U.S. PATENT DOCUMENTS

| | | | | | |
|---|---|---|---|---|---|
| 5,485,614 | A | * | 1/1996 | Kocis | G06F 3/023 341/22 |
| 5,903,259 | A | * | 5/1999 | Brusky | G06F 3/0219 345/168 |
| 6,008,921 | A | * | 12/1999 | Brusky | H04N 21/42219 398/106 |
| 6,018,335 | A | * | 1/2000 | Onley | G06F 3/023 341/22 |
| 9,015,456 | B1 | * | 4/2015 | Spangler | G06F 9/4403 713/1 |
| 9,490,842 | B2 | * | 11/2016 | Odell | H03M 11/14 |
| 9,575,840 | B1 | * | 2/2017 | Spangler | G06F 11/142 |
| 10,599,230 | B1 | * | 3/2020 | Chan | G06F 3/0238 |
| 2009/0050450 | A1 | * | 2/2009 | Cheng | G06F 3/023 200/43.01 |
| 2010/0169818 | A1 | * | 7/2010 | Hughes | G06F 3/04845 715/773 |
| 2013/0262928 | A1 | * | 10/2013 | Yang | G06F 11/267 714/27 |
| 2018/0348887 | A1 | * | 12/2018 | Paik | G06F 40/129 |
| 2019/0065300 | A1 | * | 2/2019 | Lo | G06F 11/36 |
| 2020/0183502 | A1 | * | 6/2020 | Potts | G06F 3/0238 |
| 2020/0334045 | A1 | * | 10/2020 | Chaiken | G06F 21/575 |

\* cited by examiner

*Primary Examiner* — Christopher B Shin
(74) *Attorney, Agent, or Firm* — Kilpatrick Townsend & Stockton LLP

(57) ABSTRACT

A keyboard includes a communication module configured to communicatively couple the keyboard to a host computer. The keyboard includes a plurality of keys that are configured to be physically actuated by a user. The plurality of keys can be remapped such that a signal transmitted to the host for a specific key can be changed to a different signal corresponding to a different key. The keyboard can also include an administrative mode that can be accessed in response to the user depressing a series of predetermined keys. While in the administrative mode the user can reconfigure keyboard settings, access debug functions of the keyboard and/or reset memory locations.

20 Claims, 7 Drawing Sheets

"R"

"E"

"S"

"E"

"T"

"M"

"1"

KEYBOARD HAVING REMAPPING AND ADMINISTRATIVE FUNCTIONS

BACKGROUND

Currently there are a wide variety of peripheral electronic devices that can be communicatively coupled to a host computing device. As the peripheral electronic devices become more complex with added features it may be useful for the peripheral electronic devices to have onboard intelligence that enables a user to independently communicate with and to configure the peripheral device without the need for an intermediary host computing device. It may also be beneficial for the peripheral electronic device to retain its configuration settings so it can be used with a plurality of different host computing devices without each host requiring specific software to be installed.

SUMMARY

In some embodiments a computer keyboard comprises a housing and a communication module coupled to the housing that is configured to communicatively couple the computer keyboard with a host computer. A plurality of keys are coupled to housing and are configured to be physically actuated by a user of the computer keyboard. One or more processors are disposed within the housing and are configured to, in response to physical actuation of one of the plurality of keys, cause a respective one of a plurality of signals to be transmitted to the host computer via the communication module. The one or more processors are also configured to enable at least one of the plurality of keys to be remapped such that a different one of the plurality of signals can be transmitted in response to actuation of the at least one of the plurality of keys. The one or more processors are further configured to, (1) regardless of whether the plurality of keys are remapped and (2) in response to a predetermined pattern of actuation of a combination of the plurality of keys, cause the keyboard to enter an administration mode, wherein, while in the administration mode, the one or more processors modify operation of the keyboard in response to actuation of a key of the plurality of keys.

In some embodiments, the keyboard further comprises lights that indicate the keyboard is in the administration mode. In various embodiments the one or more processors activate a lighting scheme that indicate which of the plurality of keys can be used to modify operation of the keyboard. In some embodiments, the lighting scheme forms an alphanumeric message displaying information corresponding to use of the administration mode. In various embodiments the administration mode includes a function that resets remapped keys of the plurality of keys to a default state.

In some embodiments the keyboard is further configured to have at least one memory location configured to store a set of key remappings, and wherein the administration mode selectively allows the at least one memory location to be reset to a default state. In various embodiments the keyboard communicates to the host computer a status of the remapping. In some embodiments the administrative mode includes selective activation of one of a plurality of haptic devices of the keyboard. In various embodiments the administrative mode enables debugging of a different peripheral device collocated with the keyboard. In some embodiments the one or more processors communicate with the host computer while in the administrative mode to provide information to a user.

In some embodiments a peripheral device comprises a housing and a communication module coupled to the housing that is configured to communicatively couple the peripheral device with a host computer. At least a first and a second key are coupled to the housing and are configured to be physically actuated by a user of the peripheral device. One or more processors are disposed within the housing and are configured to in response to physical actuation of the first key, cause a first signal to be transmitted to the host computer via the communication module, and in response to physical actuation of the second key, cause a second signal to be transmitted to the host computer via the communication module. The one or more processors are further configured to remap the first and the second keys such that physical actuation of the first key causes the second signal to be transmitted to the host computer and physical actuation of the second key causes the first signal to be transmitted to the host computer. The one are more processors are also configured to, (1) regardless of whether the first and the second keys are remapped, and (2) in response to a predetermined user input into the peripheral device, cause the peripheral device to enter an administration mode, wherein, while in the administration mode, the one or more processors enable the user to control features of the peripheral device that can only be accessed while in the administration mode.

In some embodiments the at least a first and a second keys are first and second keys of a keyboard comprising a plurality of alphanumeric keys and wherein the predetermined user input comprises the user physically actuating a predetermined combination of the plurality of alphanumeric keys. In various embodiments the administration mode enables the user to change configuration settings of the peripheral device. In some embodiments the configuration settings include enabling one or more haptic devices of the peripheral device. In some embodiments the peripheral device includes a memory location to store remapping data, and wherein the administration mode enables the user to reset the memory location to a factory default. In various embodiments the peripheral device further comprises a plurality of lights and wherein the one or more processors activate a predetermined combination of the plurality of lights in response to the peripheral device entering the administration mode.

In some embodiments the predetermined combination of the plurality of lights forms an alphanumeric message to the user. In various embodiments the at least a first and a second keys are first and second keys of a keyboard comprising a plurality of alphanumeric keys and wherein each of the plurality of lights is associated with a key of the keyboard. In some embodiments the one or more processors communicate a status of the remapping to the host computer. In various embodiments the one or more processors communicate with the host computer while in the administrative mode to provide information to a user.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
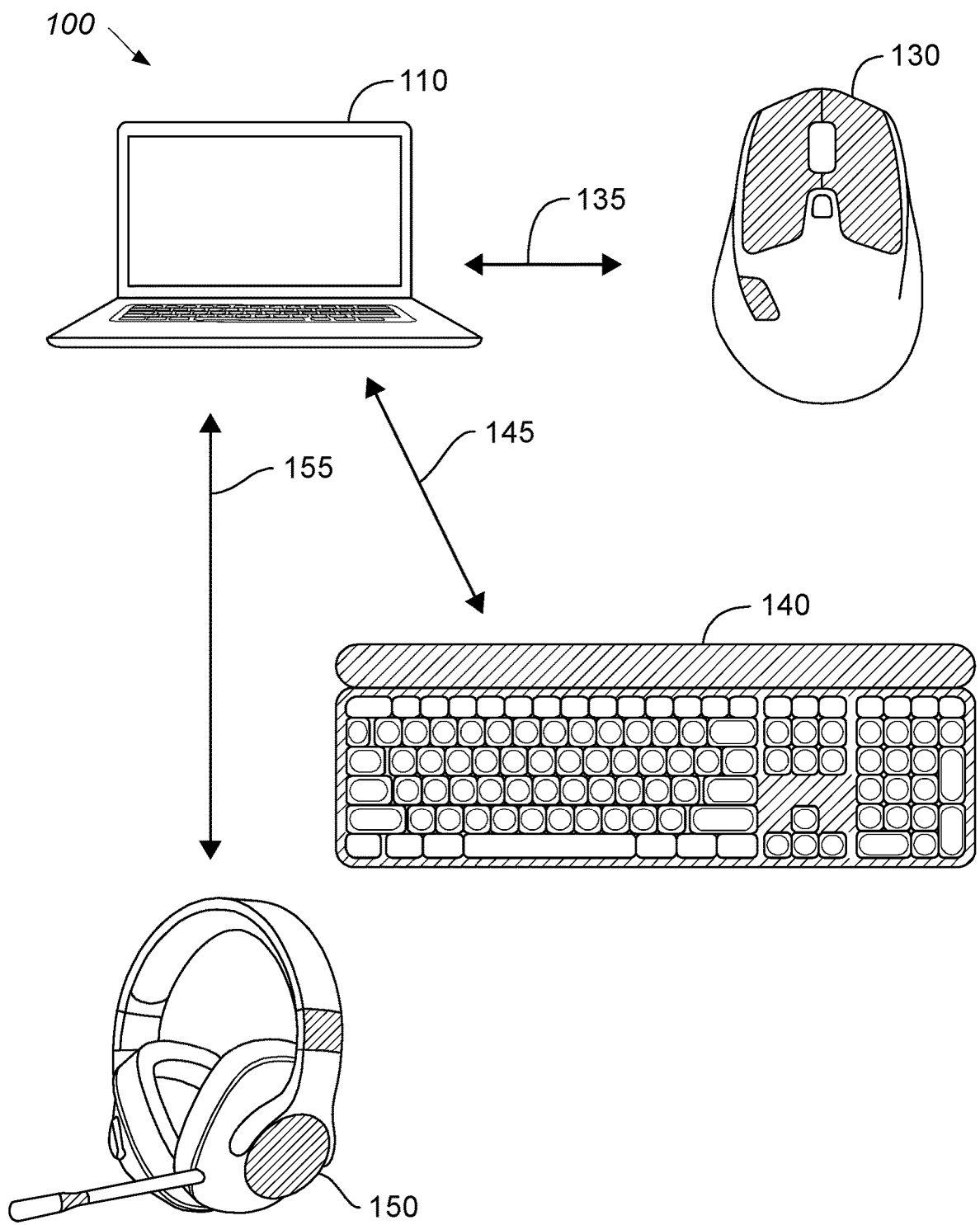
FIG. 1 is a host computing device communicatively coupled to peripheral devices, according to an embodiment of the disclosure.

Aspects of the present disclosure relate generally to configuring and/or debugging the operation of peripheral computing devices, and more particularly to remapping the assignment of keyboard keys, changing keyboard configuration settings and/or entering a keyboard troubleshooting mode to debug features of the keyboard, according to certain embodiments.

In the following description, various examples of interacting with a keyboard are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to various novel methods to remap keyboard keys, change keyboard configuration settings or enter a troubleshooting mode to debug features of the keyboard.

Although increased functionality of peripheral keyboards offers improved flexibility and convenience for the user, access to these functions and debugging functional complexities can result in an increased need for a the keyboard to have a user interface enabling the user to directly communicate with the keyboard without the need for a host computing device. In addition, as peripheral devices become more complex there is a need for the peripheral device to be configured independent of a particular host computing device so the peripheral device can operate the same way with any number of different host devices.

As a result, keyboard devices disclosed herein may enable direct communication with a user without going through an intermediary host computer. This enables the keyboard to be an independently configurable device that can maintain its configuration between any number of host computers. This also enables the keyboard to be programmed (e.g. configured) by a user without the need to download and install application software on a host computer. In one embodiment the keyboard includes a remapping mode that allows a user to remap certain keys of the keyboard to other keys to improve the usability of the keyboard for particular applications such as gaming, drafting or other application specific tasks. Different games and/or tasks may benefit from having separate remapped key configurations stored in the keyboard memory so a user can easily toggle from one keyboard remapping configuration to another.

In further embodiments, the keyboard can include an administrative mode that enables the user to configure and/or troubleshoot the keyboard functions. More specifically, in some embodiments the use of an administrative mode can enable a user to toggle haptics (e.g., sounds, vibrations and the like), to set lighting schemas, reset individual keyboard remapping memory locations, etc. The administrative mode may also include a debugging mode in which features of the keyboard can be debugged. In one example all of the lights can transition colors simultaneously so a user can determine if a light is not working. In another embodiment where the key resistance can be configured all of the keys can be set to a "click" type feel and the user can test each key to make sure they all work accordingly. In some embodiments the debugging mode can be used in conjunction with a service technician to debug features of the keyboard.

To facilitate key remapping and/or to assist a user in navigating administrative functions, the keyboard can communicate with the user using any of the keyboard features including, but not limited to, turning lights on/off, changing the color of one or more lights, arranging lights to spell out alphanumeric messages, engaging haptics and/or emitting audible sounds or recordings.

Within this disclosure methods are disclosed that enable a peripheral device to be reconfigured by a user via a user interface, independent from a host computing device. More specifically, methods are disclosed that enable a user to of a keyboard to configure one or more key remapping memory locations, change keyboard configuration settings and/or a debug the keyboard in a debugging mode. An example host computing device and a plurality of communicatively coupled peripheral devices are illustrated in FIG. 1. As described in FIG. 2 a keyboard peripheral device includes memory keys that enable a user to program and access different key remapping memory locations. In FIG. 3 the keyboard uses illuminated keys as a user interface to assist the user with the key remapping process.

Figure 4:
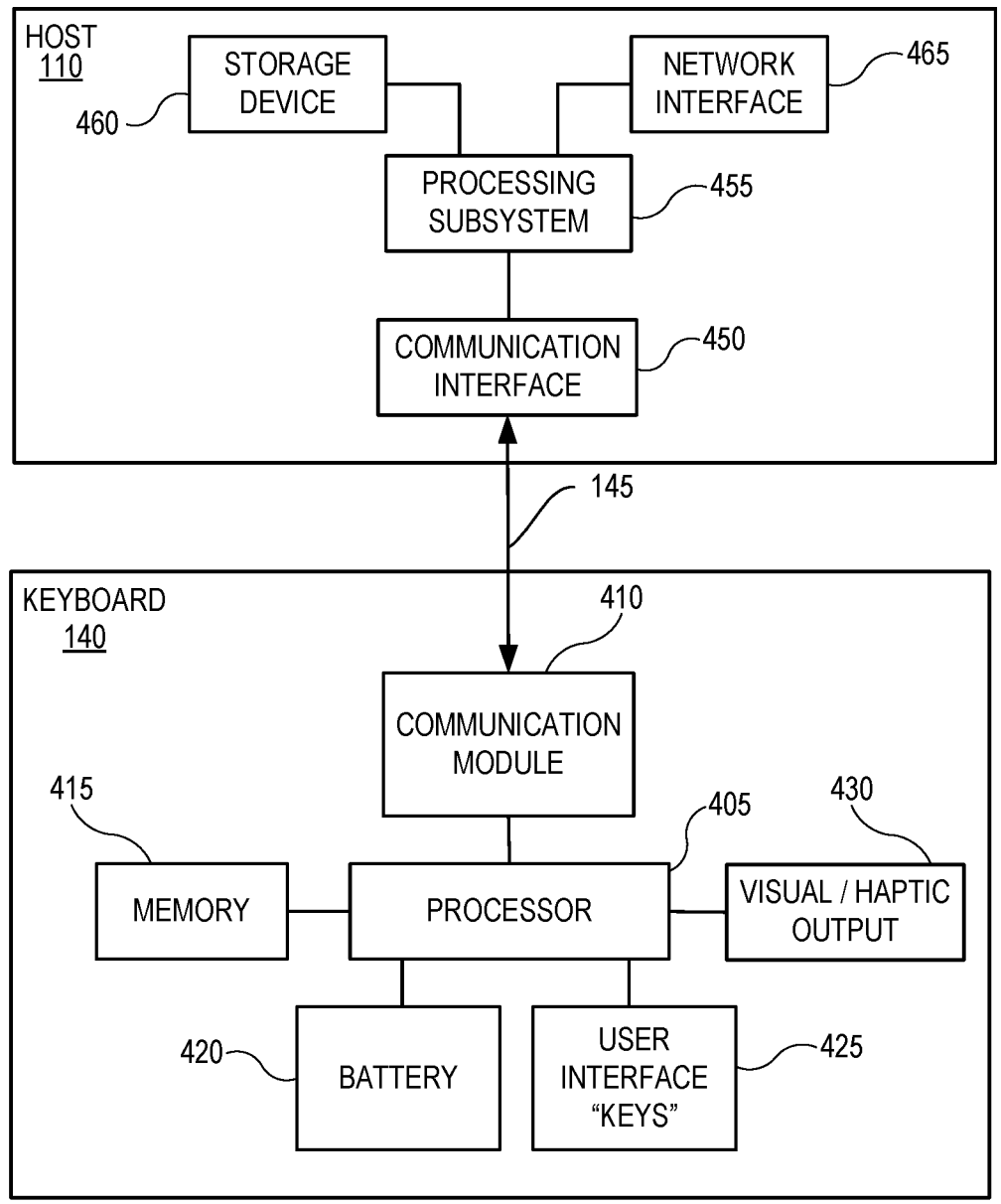
FIG. 4 is a simplified block diagram of the host computing device and the keyboard shown in FIG. 1.

In FIG. 4, a system block diagram of an example keyboard device and a host computer describe system level features of each device. The keyboard includes a separate processor and battery that enables the keyboard to operate independently from the host device. As described in FIG. 5 a method of operation for remapping keys using user interface features of the keyboard is described.

Figure 6A:
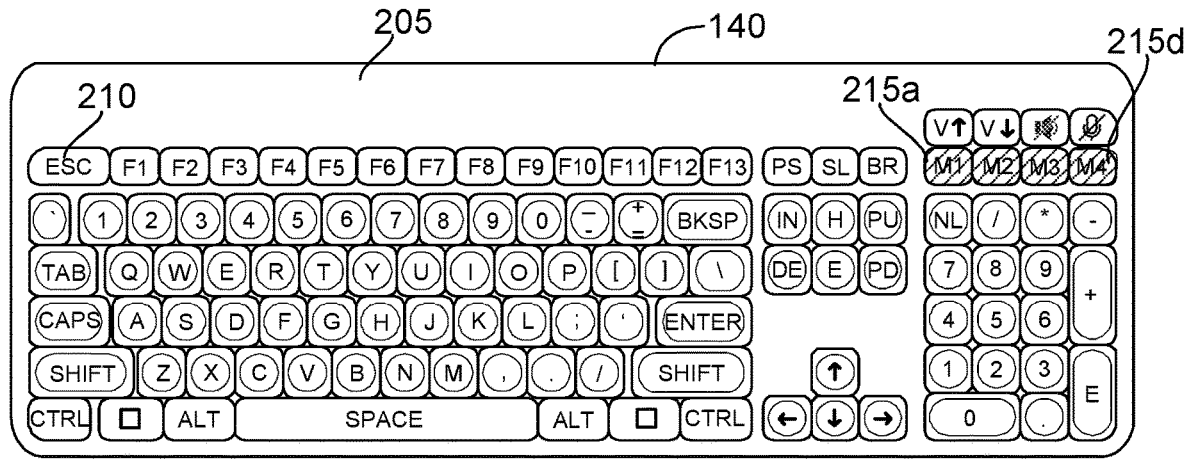
FIGS. 6A and 6B are detailed plan views of the keyboard peripheral device shown in FIGS. 1-4 communicating to a user that remapped keys have been stored in a memory location.
Figure 6B:
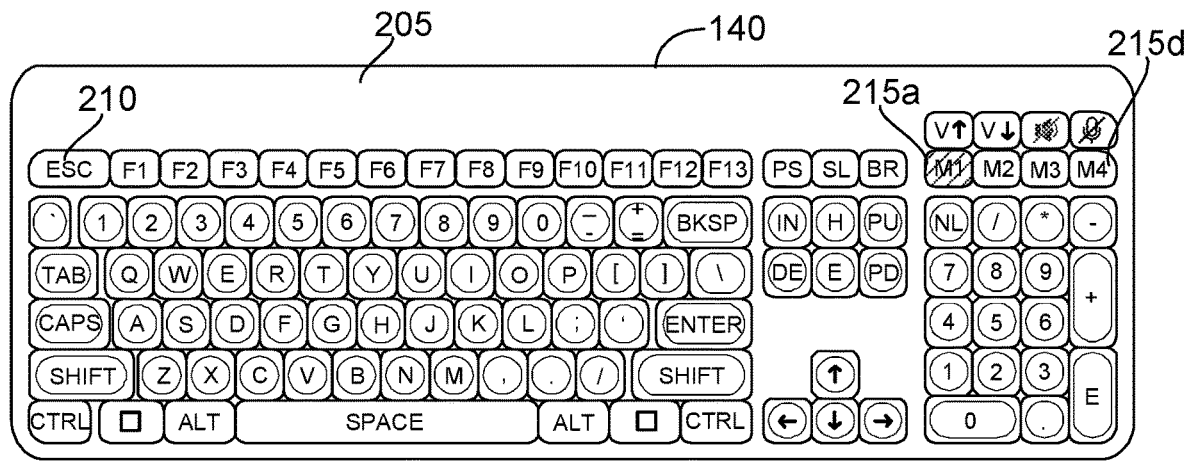
Figure 7A:
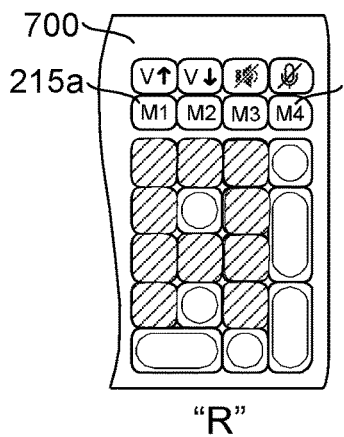
FIGS. 7A-7G are images of the numeric keypad of the keyboard peripheral device illustrated in FIGS. 1-4 displaying a message to a user.
Figure 7B:
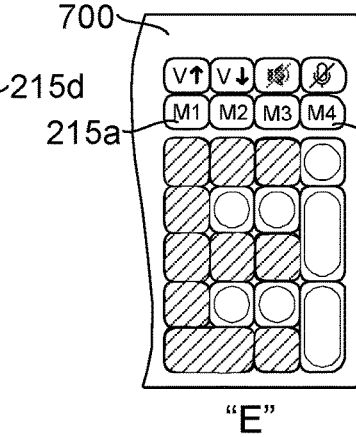
Figure 7C:
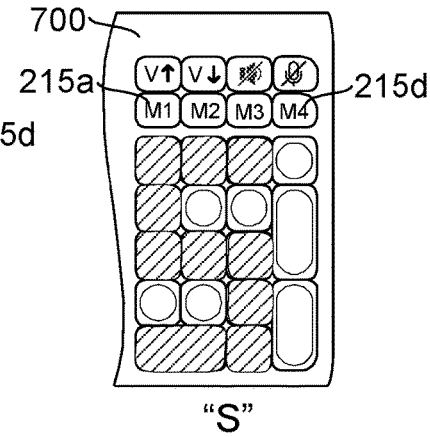
Figure 7D:
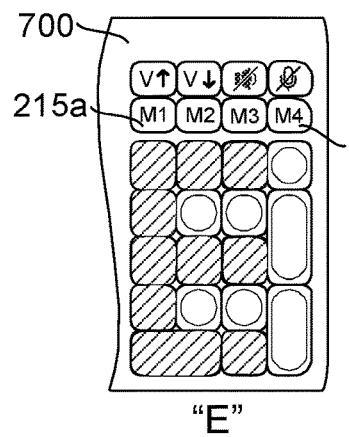
Figure 7E:
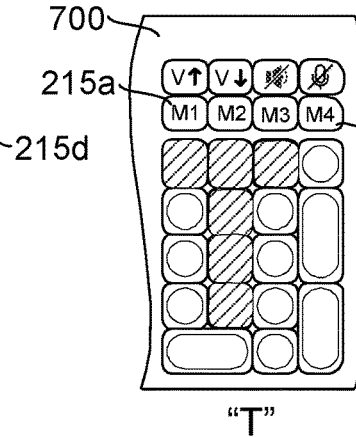
Figure 7F:
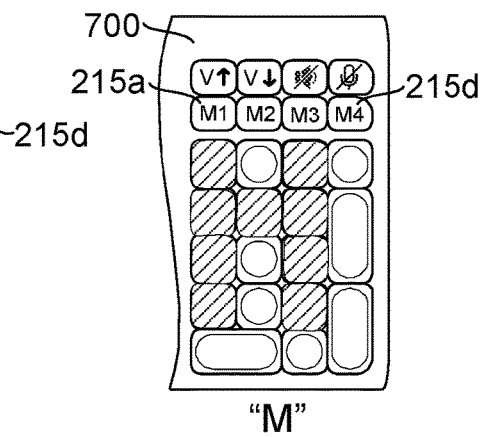
Figure 7G:
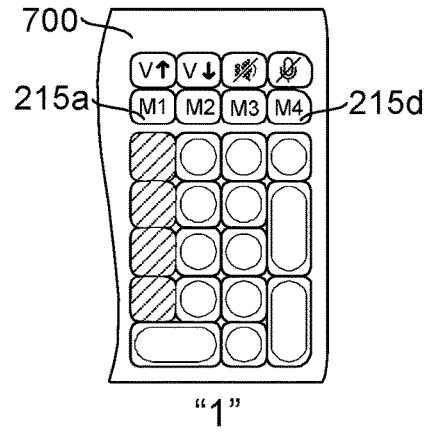

As described in FIGS. 6A and 6B the keyboard uses lights as a user interface to assist a user in performing the key remapping process. As described in FIGS. 7A-7G the numeric keypad of the keyboard is used as a user interface to display an alphanumeric message to the user that the first memory location has been reset. As described in FIG. 8 the keyboard can have one or more administrative modes in which the keyboard configuration settings can be changed, debugging routines can be activated, and/or resetting specific key remapping memory locations can be performed.

Although embodiments are described herein with regard to a keyboard peripheral computing device, the features disclosed herein are applicable to any peripheral computing device including, but not limited to, mice, headsets, trackballs and other pointing devices, speaker systems, foot pedals, steering wheels or any other peripheral device that can be communicatively coupled to a host computing device.

FIG. 1 illustrates a system 100 including a host computing device 110 that can be communicatively coupled to a plurality of peripheral electronic accessories that include, but are not limited to a mouse 130, a keyboard 140 and a headset 150, according to certain embodiments. Host computing device 110 may include any suitable computing device, such as a desktop computer, laptop computer, tablet computer, wearable computing device (e.g., head-mounted display, smart watch, etc.), entertainment/infotainment system, vehicle computing systems, cellular phone or other suitable computing device. Although one host computing device is shown, one of skill in the art will appreciate that multiple computing devices may be used. In some embodiments peripheral devices 130, 140, 150 can be communicatively coupled to host computing device 110 via wireless or wired communication channels 135, 145, 155, respectively. In one embodiment each peripheral device 130, 140, 150 can be independently powered and wirelessly communicates with host computing device 110. In some embodiments one or more of peripheral devices 130, 140, 150 have independent logic and/or memory and can be controlled independent of host computing device 110, as described in more detail below.

Figure 2:
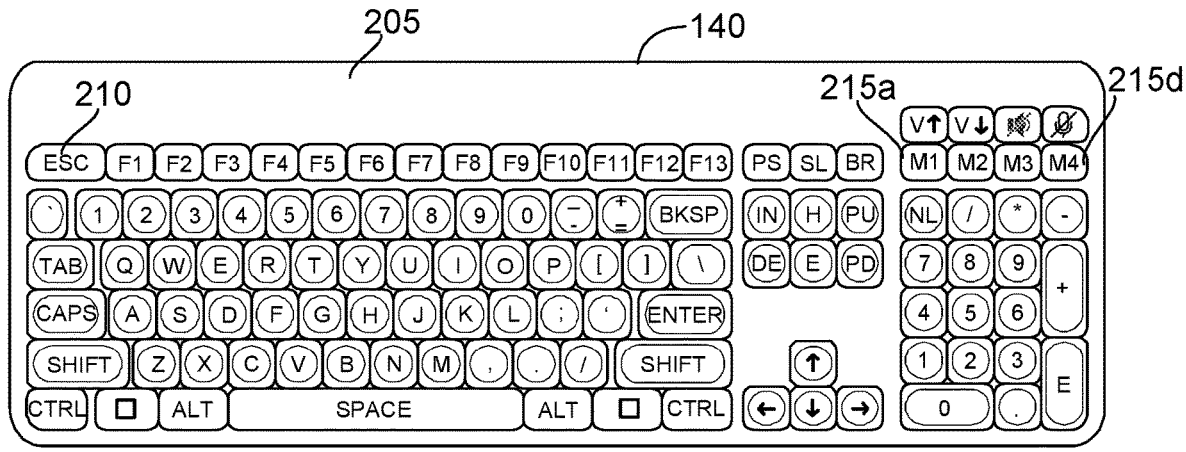
FIG. 2 is a detailed plan view of the keyboard peripheral device shown in FIG. 1.
Figure 3:
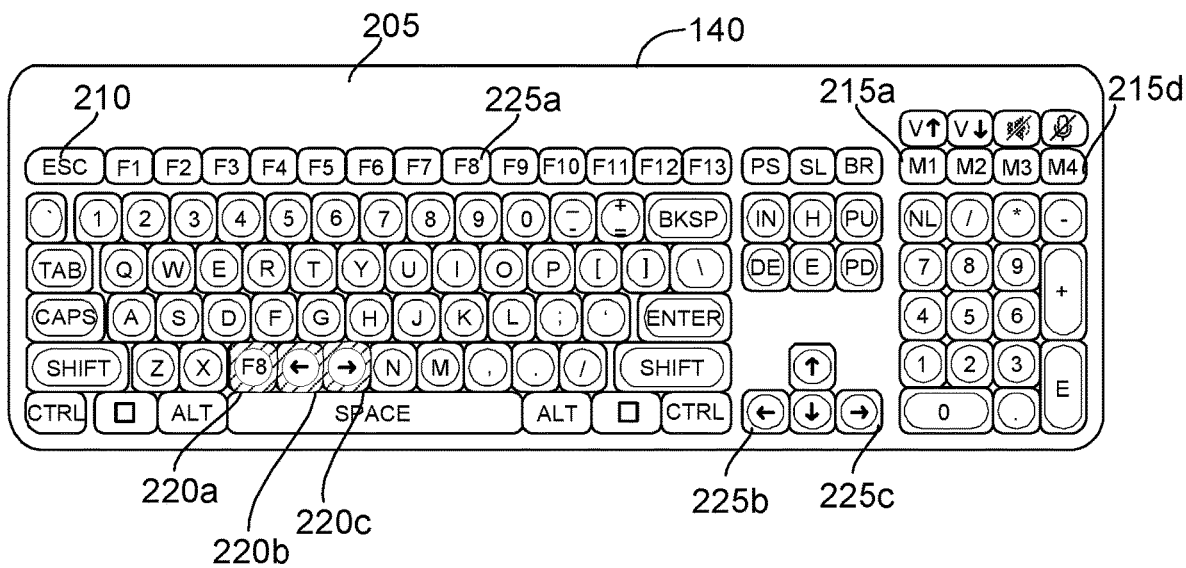
FIG. 3 is detailed plan view of the keyboard peripheral device shown in FIGS. 1 and 2 with remapped keys.

FIG. 2 illustrates a more detailed plan view of keyboard 140 shown in FIG. 1. As shown in FIG. 2, keyboard 140 includes a housing 205 and a plurality of keys 210 coupled to housing, wherein the plurality of keys are configured to be physically actuated by a user of the keyboard. In response to each key being physically actuated, keyboard 140 transmits a corresponding signal to host computing device (such as host 110, in FIG. 1). In some embodiments keyboard 140 can include a key remapping function that enables a user to change the corresponding signal that is transmitted to the host computing device for a particular key and may also include an administrative mode that enables a user to access keyboard settings and/or debugging options.

In some embodiments keyboard 140 can include an independent power source, logic circuitry, and memory and can be configured by a user independent of a host computing device so the configuration of the keyboard remains constant between different host computing devices. Keyboard 140 can include lights, haptics, audible output devices and other features that can be used to communicate with a user to facilitate navigation of the keyboard functions. In one example, keyboard 140 includes memory mapping keys 215a-215d labeled M1-M4 where each key corresponds to a unique "remapping" of keys 210, as explained below. In further embodiments, keyboard 140 can include an administrative function that enables a user to change settings (e.g., lighting, haptics, key feel, etc.) of the keyboard and to perform system reset and/or debugging functions, as also described below.

Key Remapping

FIG. 3 illustrates a detailed plan view of keyboard 140 shown in FIGS. 1 and 2 in a remapped configuration. As shown in FIG. 3, keyboard 140 has the same key layout of keys 210 as the keyboard shown in FIGS. 1 and 2, however in FIG. 3 keys 220a-220c have been remapped to key functions 225a-225c, respectively, where the remapped keys are indicated by shading. More specifically, as shown in FIG. 3, key 220a (which corresponds to "C" in FIG. 2), is now remapped to transmit a signal to the host computing device corresponding to key 225a (which corresponds to "F8"). That is, when key 220a is depressed by a user, instead of keyboard 140 transmitting a signal to a host computing device corresponding to "C", the keyboard transmits a signal to the host computing device that corresponds with "F8" (key 225a). Similarly, when key 220b is depressed, keyboard 140 transmits a signal to the host computing device corresponding to "Left Arrow" (key 225b) and when key 215c is depressed the keyboard transmits a signal corresponding to "Right Arrow" (key 225c).

In one embodiment this particular remapping configuration is saved in a remapping memory location M1 and can be activated by depressing key 215a. This particular embodiment of keyboard 140 includes four separate key remapping configurations that can each be accessed by depressing the corresponding key, M1-M4 (keys 215a-215d). In some embodiments keyboard 140 can use lights and/or lighting colors to indicate to a user that keys 220a . . . 220c are remapped and the keyboard is currently using the M1 remapping configuration. In one example key 215a "M1" can be lighted red while keys 215b-215d "M2-M4" are lighted in white. In some embodiments while the M1 remapping configuration is active the remapped keys may be a different color, for example remapped keys 220a-220c can lighted in blue while all remaining unmapped keys are lighted in white.

In one embodiment, to toggle from the M1 remapping back to the standard configuration illustrated in FIG. 2, the user can depress M1 a second time. Keyboard 140 can change a light color, emit a sound and/or engage haptics to alert the user that the remapped key configuration corresponding to "M1" is no longer being used and that the keyboard is now in its default map setting. In one example the keyboard can emit an audible sound and change M1 (key 215a) back to white along with remapped keys 220a-220c. In another embodiment a user can depress M2 (key 225b) corresponding to a remapped key configuration saved in a second memory location and key 215b can change colors to alert a user that the keyboard is now configured to the M2 key remapping configuration.

In further embodiments a complete system reset of the keyboard, bringing the keyboard back to factory defaults with no stored key remapping configurations, can be performed by depressing a predetermined combination of keys. In one example the user can perform a system reset by simultaneously depressing M1-M4 (keys 215a-215d) along with the "F1" key. The keyboard can confirm that the system has been reset, for example, by flashing all lights from white to red three times and emitting an audible tone. One of skill in the art with the benefit of this disclosure will appreciate the myriad ways in which keyboard 140 can use lights, colors, haptics and audible tones to communicate with a user.

In some embodiments the keys used to reset keyboard 140 remapping memory can be selected on a basis of preventing the keyboard from entering an unrecoverable state. More specifically, keyboard 140 may only allow certain keys to be remapped and may prevent keys from being remapped that may be necessary for resetting the keyboard remapping memory. In one example only proprietary keys (e.g., keys that are not on a standard keyboard) such as the M1-M4 keys 215a-215d can be used. In other embodiments certain system function keys can be omitted from the remapping options such as a "windows key", "escape key", etc.

In further embodiments one or more "inert" keys can be used to perform the remapping memory reset. Such inert keys can be keys that when depressed do not cause catastrophic or troublesome issues with the host, for example "shift", "control", "alt", "scroll lock", "insert", "print screen" and the like. In this way, if a user must depress one or more such keys and hold them for a period of time before the keyboard memory is reset, at least no potentially harmful commands are transmitted to the host computing device. In yet further embodiments any keys can be selected to perform the remapping memory reset and keyboard processor can recognize the reset command before transmitting any commands to a host computing device. Further, in some embodiments, regardless of whether any keys have been remapped, the keyboard processor can be configured to always recognize when a specific combination of keys have been depressed and to execute the memory reset accordingly. One of skill in the art with the benefit of this disclosure will appreciate the myriad key combinations that can be used to reset the keyboard to factory defaults.

FIG. 4 illustrates a simplified block diagram of keyboard 140 and an example host computing device 110 shown in FIG. 1. As shown in FIG. 4, keyboard 140 can include a processor 405 that is coupled to a communication module 410, a memory 415, a battery 420, one or more user interface keys 425 and visual/haptic output 430. Plurality of user interface keys 425 are configured to be physically actuated by a user of the keyboard with each key communicating a unique signal to processor 405. Processor 405 includes circuitry that receives a unique signal from each user interface key 425 and responds by commanding communication module 410 to transmit a signal corresponding to that particular key to host computer 110 via communication channel 145. Processor 405 can be programmed to employ one or more visual and/or haptic outputs 430 (e.g., lights, audible sounds, vibrations, etc.) to assist the user in communicating with the keyboard to navigate key remapping and/or administrative functions, as described in more detail below.

In some embodiments battery 420 can independently power all of the keyboard functions, including processor 405. In such embodiments keyboard 140 can be configured and/or debugged independently from host computing device 110 with the configurations stored in memory 415. In further embodiments, keyboard 140 can be used with multiple host computing devices 110 and can maintain a constant configuration regardless of the host that it is communicating with. Further, in some embodiments there may be no need for a host computing system to install software to communicate with keyboard 140.

Processor 405 can include any type of logic device including a programmable integrated circuit or, e.g., one or more single-core or multi-core microprocessors and/or microcontrollers executing program code to perform various functions associated with keyboard 140. For example, processor 405 can implement various processes (or portions thereof) described above as being implemented by a peripheral device, e.g., by executing program code stored in memory 415. Processor 405 can also execute other programs to control other functions of keyboard 140. In some instances programs executed by processor 405 can interact with a host (e.g., host 110), e.g., by generating messages to be sent to the host and/or receiving messages from the host. In some instances, the messages can be sent and/or received using communication module 410 or a wired connection.

Communication module 410 can provide wireless or wired communication capability for keyboard 140. In some embodiments communication module 410 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication module 410 can provide wired network connectivity (e.g., Ethernet) in addition to or instead of a wireless interface. Communication module 410 can be implemented using a combination of hardware (e.g., driver circuits, antennas, modulators/demodulators, encoders/decoders, and other analog and/or digital signal processing circuits) and software components. In some embodiments, communication module 410 can support multiple communication channels concurrently or at different times, using the same transport or different transports. Thus, for example, keyboard 140 can communicate with a host via a local channel at some times and via a relay service at other times.

Memory 415 can be implemented, e.g., using disk, flash memory, or any other non-transitory storage medium, or a combination of media, and can include volatile and/or non-volatile media. In some embodiments, memory 415 can store one or more programs (e.g., firmware) to be executed by processor 405, including programs to implement various operations described above as being performed by a keyboard, as well as operations related to particular keyboard device behaviors. Memory 415 can also store a peripheral device object or peripheral device definition record that can be furnished to host devices, e.g., during device discovery. Memory 415 can also store peripheral device state information and any other data that may be used during operation of keyboard 140. Memory 415 can also store program code executable to communicate with a communication interface 450, as shown in host device 110.

Battery 420 can include any type of energy storage device including rechargeable and non-rechargeable devices. In some embodiments battery 420 is nickel metal hydride, nickel cadmium, lithium-ion or lead acid configuration. One of skill in the art with the benefit of this disclosure will appreciate that other types of energy storage devices can be used. In some embodiments battery 420 can be wirelessly rechargeable.

User interface keys 425 can include user-operable input devices such as one or more depressible keys. Each user interface key 425 can correspond to a unique signal that is communicated to processor 405 so the processor recognizes the user's desired input. In some embodiments one or more of the keys include a braking mechanism that adjusts the way the key feels when a user depresses it. In one embodiment a user can make such adjustments in an administrative mode of the keyboard.

Visual/haptic output 430 can include any output device that can be used to communicate with a user. In some embodiments lights can be turned on or off, lights can change colors, lights can flash at different rates. Haptic devices can vibrate, ping or tap the keyboard and in some embodiments may include unbalanced motors that provide vibrations and/or voice coils. In various embodiments a haptic device can be included in a base or wrist rest or they can be key specific. For example, the feel of a key can be changed via piezo devices or electromechanical actuators that can change the feel of the key from a linear resistance, to a "clicky" feel, etc. Changes in the feel to the user can also be used with an active feedback brake pedal, steering wheel or other peripheral device. In addition, the debug menu can be combined with the electrostatic keyboard concept that we filed before to change the profile of the braking applied to a key to determine if there is an issue with a keyboard itself or on a host device not sending a correct command. This same concept can be used to debug a haptic or profile alterable scroll wheel (e.g., on our computer). Audible devices can emit beeps, tones, music, recorded messages and/or electronically generated messages. In further embodiments display screens can be used. In one embodiment one or more lights that illuminate keys can be used as a digitized display screen. That is each key light can be used to display an alphanumeric message to the user. The message can be stationary and/or the message can scroll, and/or the message can include sequentially displayed characters. One of skill in the art with the benefit of this disclosure will appreciate that other types of visual/haptic output devices can be used without departing from this disclosure.

FIG. 4 also shows a simplified block diagram of an example host 110, which may be illustrative of the features and functions of host device 110 illustrated in FIG. 1, according to certain embodiments. In some embodiments, host 110 can implement any or all of the functions, behaviors, and capabilities described herein as being performed by a host, as well as other functions, behaviors, and capabilities not expressly described. Host 110 can include processing subsystem 455, storage device 460, network interface 465, communication interface 450. Host 110 can also include other components (not explicitly shown) such as a battery, power controllers, and other components operable to provide various enhanced capabilities. In various embodiments, host 110 can be implemented in a desktop computer, laptop computer, tablet computer, smart phone, other mobile phone, wearable computing device, cellular phone or other systems having any desired form factor. Further, in some embodiments host 110 can be implemented partly in a base station and partly in a mobile unit that communicates with the base station and provides a user interface.

Communication interface 450 can provide voice and/or data communication capability for host 110. In some embodiments communication interface 450 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 450 can provide wired network connectivity (e.g., Ethernet) in addition to or instead of a wireless interface. Communication interface 450 can be implemented using a combination of hardware (e.g., driver circuits, antennas, modulators/demodulators, encoders/decoders, and other analog and/or digital signal processing circuits) and software components. In some embodiments, communication interface 450 can support multiple communication channels concurrently or at different times, using the same transport or different transports. Thus, for example, host 110 can communicate with accessories via a local channel at some times and via a relay service at other times.

Processing subsystem 455 can be implemented as one or more integrated circuits, e.g., one or more single-core or multi-core microprocessors or microcontrollers, examples of which are known in the art. In operation, processing system 455 can control the operation of host 110. In various embodiments, processing subsystem 455 can execute a variety of programs in response to program code and can maintain multiple concurrently executing programs or processes. At any given time, some or all of the program code to be executed can be resident in processing subsystem 455 and/or in storage media such as storage device 460.

Through suitable programming, processing subsystem 455 can provide various functionality for host 110. For example, in some embodiments, processing subsystem 455 can implement various processes (or portions thereof) described above as being implemented by a host. Processing subsystem 455 can also execute other programs to control other functions of host 110, including application programs that may be stored in storage device 460. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a communication interface 450.

Storage device 460 can be implemented, e.g., using disk, flash memory, or any other non-transitory storage medium, or a combination of media, and can include volatile and/or non-volatile media. In some embodiments, storage device 460 can store one or more application and/or operating system programs to be executed by processing subsystem 455, including programs to implement various operations described above as being performed by a host. For example, storage device 460 can store a uniform host application that can read a peripheral device description record and generate a graphical user interface for controlling the peripheral device based on information therein. Storage device 460 can also store program code executable to communicate with a communication module 410 of a peripheral keyboard device 140. Although FIG. 4 illustrates communication interface 450 as a subsystem of host 110 it is understood that communication interface 450 may be a dongle that is plugged into and electrically coupled with host 110. In some embodiments, portions (or all) of the host functionality described herein can be implemented in operating system programs rather than applications. In some embodiments, storage device 460 can also store apps designed for specific accessories or specific categories of accessories (e.g., keyboard 140, an IP camera app to manage an IP camera peripheral device or a security app to interact with door lock accessories).

Network interface 465 can include any type of connection to a network including wired Ethernet, RS-232 or other and wireless including, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments network interface 465 can provide wired network connectivity (e.g., Ethernet) in addition to or instead of a wireless interface. Network interface 465 can be implemented using a combination of hardware (e.g., driver circuits, antennas, modulators/demodulators, encoders/decoders, and other analog and/or digital signal processing circuits) and software components.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 110 can perform all operations described above as being performed by a media access device and that an implementation of keyboard 140 can perform any or all operations described above as being performed by a peripheral device. A proxy, bridge, tunnel, or coordinator can combine components of host 110 and keyboard 140, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Figure 5:
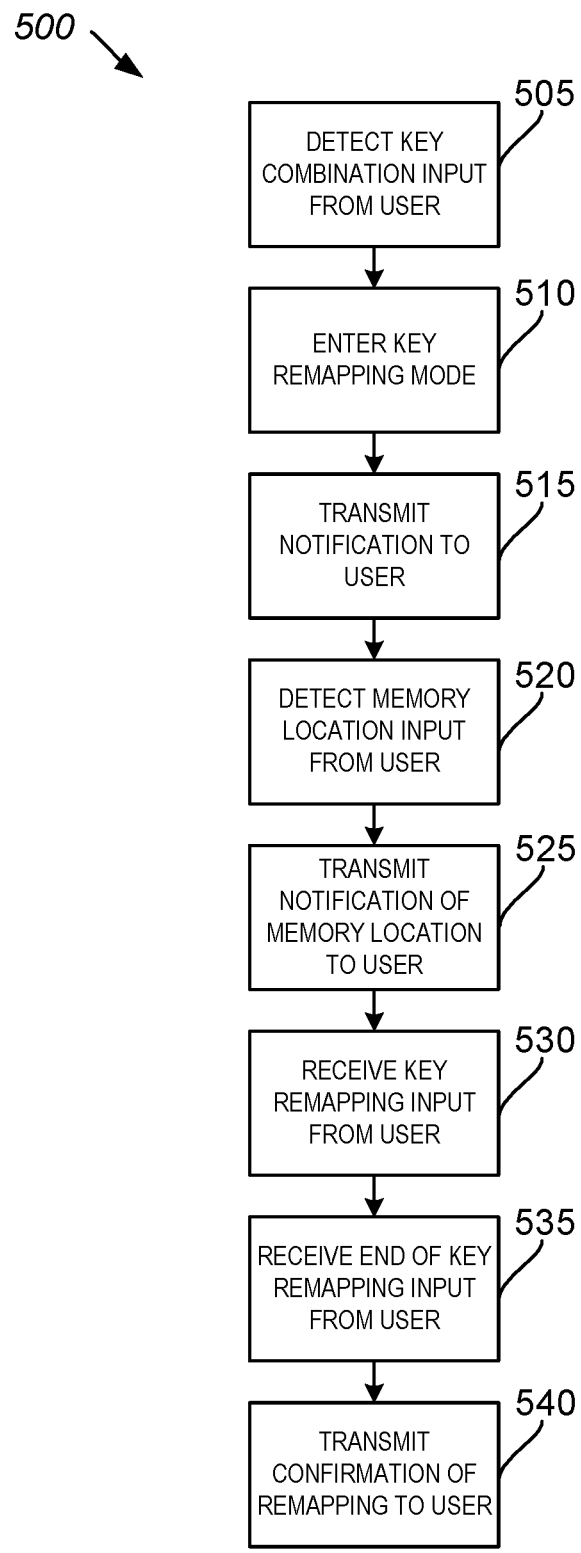
FIG. 5 is a method of remapping keys of the keyboard peripheral device shown in FIGS. 1-4.

FIG. 5 illustrates steps associated with a method 500 of entering and saving a key remapping configuration according embodiments of the disclosure. As shown in FIG. 5, in step 505 the keyboard detects a particular key combination input from a user. In some embodiments the particular keys are a unique combination that when depressed together, cause the processor to enter a remapping mode. In one embodiment all four memory storage keys along with the "F 1" key can be simultaneously depressed, however other key combinations can be used in other embodiments.

In step 510 the keyboard enters a remapping mode in response to detecting the key combination input from the user. The remapping mode can enable a user to reassign designated keys to transmit other key functions to a host computing device.

In step 515 the keyboard transmits a notification to the user that the keyboard has entered a remapping mode. In one example all of the keys that can be remapped flash red three times and remain illuminated with a blue color. In some embodiments the key remapping memory keys M1-M4 (keys 215a-215d) can illuminate in a red color as shown in FIG. 6A.

In step 520 the keyboard detects a memory location input from a user. In one embodiment the keyboard detects one of the memory keys that the user depresses.

In step 525 the keyboard transmits notification of the selected memory location to the user. In one embodiment if the memory keys are all illuminated in red, after the user depresses key M1 215a for example that key illuminates in blue (as shown in FIG. 6B) to let the user know they have selected memory location 1. In other embodiments the keyboard can transmit an alphanumeric message to the user or notify them another way.

In step 530 the user remaps keys on the keyboard. In one embodiment if all the keys are illuminated as white, as a user depresses a key for remapping that key turns green and then the user depresses the key they desire it to be remapped to and that key turns red. After two keys are depressed the keyboard flashes white three times and waits for the next key remapping combination to be entered.

In step 535 the user can end the remapping programming by providing input to the keyboard. In one embodiment the user can depress the M1 key again which notifies the keyboard that programming has ended.

In step 540 the keyboard can transmit a confirmation to the user that remapping has ended by for example flashing all of the memory key lights red three times. In further embodiments the keyboard can transmit a status of the key remapping to the host computing device so the host is aware of a status of the remapped keys (e.g., that they are or are not remapped).

As would be appreciated by one of skill in the art, the keyboard communication functions described above are for example only and any combination of lights, haptics and/or audible sounds can be used.

It will be appreciated that method 500 is illustrative and that variations and modifications are possible. Steps described as sequential may be executed in parallel, order of steps may be varied, and steps may be modified, combined, added or omitted.

Administrative Function

As described above, in some embodiments keyboard 140 can include an administrative function in which a user can perform a specific memory location reset (e.g., reset one key remapping memory instead of all memories), can change system functions (enable/disable haptic buzzes and/or beeps) or can be used for a troubleshooting/debugging function. In further embodiments the lights, haptics, audio devices can be used by keyboard 140 to assist a user with navigating the administrative functions, as described in more detail below.

FIGS. 7A-7G illustrate a partial plan view of numeric keypad 700 of a keyboard and a notification process that can be used for resetting only one particular key remapping memory, M1. Similar to the process described above, a user can enter the administrative function by depressing a particular combination of keys, a particular key, and/or any other way. Once the processor recognizes the administrative function has been entered the keyboard can communicate with the user using lights, haptics, audio features or any other features to help the user navigate the menu. In further embodiments a different combination of keys can be used to enter different administrative functions. For example, in one embodiment by depressing the "F1" key along with the "scroll lock" and the "shift" keys the system can enter a memory reset mode.

In the embodiment illustrated in FIGS. 7A-7G the user has entered a key remapping memory reset function and the keyboard communicates this function to the user, by for example flashing M1-M4 in red lights. The user can respond by depressing any one of keys M1-M4 to erase the memory remapping for that particular memory location. For example, the user can depress key M1, key 215a in FIG. 7A. The processor can respond and confirm to the user by flashing M1 as a blue light (instead of red for M2-M4). As soon as the user depresses M1 a second time the system can confirm to the user that M1 has been reset.

For example, as shown in FIGS. 7A-7G the keyboard can communicate to a user that memory remapping location M1 has been reset by flashing a series of color coded images on the numeral keypad 700. Each series of images can be illustrated to a user by contrasting colors or by contrasting lights in an on and off pattern. That is, the shaded keys in FIGS. 7A-7G can all have one particular color that contrasts with the non-shaded keys. Thus, FIGS. 7A-7G can spell out the following message to a user "M1 RESET" so the user knows that memory location 1 has been reset. One of skill in the art with the benefit of this disclosure can appreciate that other keys, color combinations, can be used to communicate with a user including, but not limited to scrolling alphanumeric messages across the keyboard keys, audio signals that can include anything from a sound to a recorded or generated message that states "M1 RESET" transmission of a message to host computing device, transmission of a message to any other electronic device including a portable electronic device such as a tablet, cellular phone, smart watch, etc.

Figure 8:
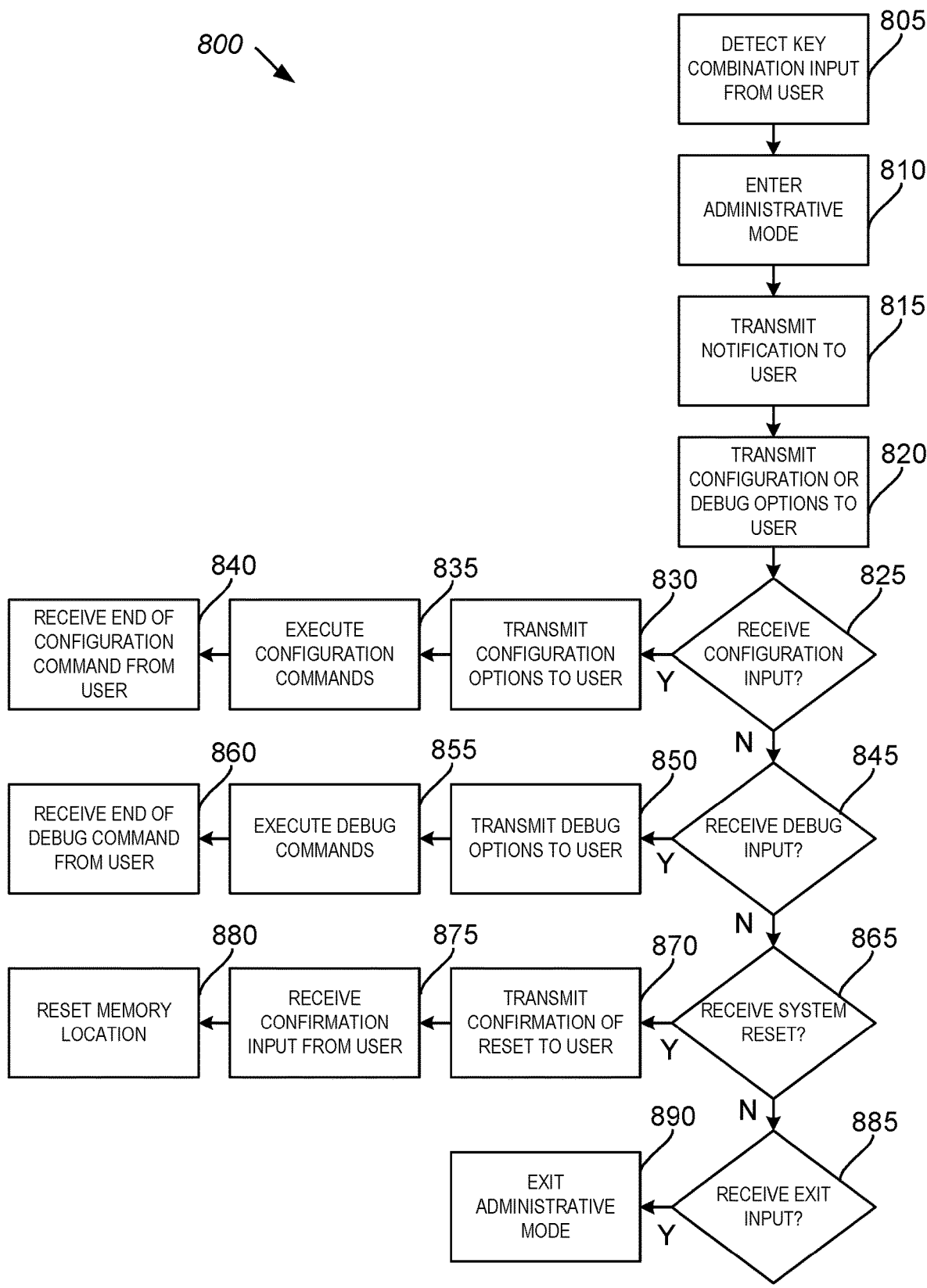
FIG. 8 is a method of navigating an administrative mode of the keyboard illustrated in FIGS. 1-4.

FIG. 8 illustrates steps associated with a method 800 of entering an administrative mode of a keyboard according to embodiments of the disclosure. As shown in FIG. 8, in step 805 the keyboard detects a particular key combination input from a user. In some embodiments the particular keys are a unique combination that when depressed together, cause the processor to enter an administrative mode. In one embodiment the "Shift", "Control" and "F 1" keys can be simultaneously depressed to enter the administrative mode, however other key combinations can be used in other embodiments.

In step 810 the processor of the keyboard enters the administrative mode in respond to detecting the key combination input in step 805.

In step 815 the keyboard transmits a notification to the user that the keyboard has entered the administrative mode. In one embodiment the keyboard can notify the user by flashing all of the function keys red, then white, then blue.

In step 820 the keyboard can transmit options to the user by flashing certain keys that each have a specific function. For example, the keyboard can flash keys F1, F5, F9 and "End" so the user is aware that they can select any of these keys. For example, if the user depressed F1 the keyboard processor will proceed to step 825 and enter a configuration mode. If the user depresses F5 the keyboard processor will proceed to step 845 and enter a debug mode. If the user depresses F9 the keyboard processor will proceed to step 865 and enter a system reset mode. If the user depresses the "End" key the keyboard processor will proceed to step 885 and exit the administrative mode in step 890.

After step 825, the keyboard is in a configuration mode in which any features of the keyboard can be configured by the user. For example lights, haptics and audible alerts can be changed such as default light color, haptic vibration with each key press, etc. In another embodiment the keyboard keys can be configured to have a different feel via an electrostatic braking system. In step 830 the keyboard can communicate configuration options to a user by flashing lights that correspond with light settings, haptic settings, audio settings and/or keyboard feel settings. After a user depresses a particular key, the keyboard can execute the configuration setting change in step 835. For example, the keyboard can notify the user that the change has been executed by flashing all of the keys red three times.

In step 840 the user can depress a key that notifies the keyboard processor that the configuration changes are complete. In one embodiment the user can signify this by depressing the "End" key and the keyboard can either exit the administrative function or go back to step 820.

After step 845, the keyboard is in a debugging mode in which a user can troubleshoot one or more features of the keyboard. In one example the user can toggle all of the lights through red, blue and green colors to determine if any of the lights are defective. In another mode the user can engage haptics, test audible alerts, test key feel settings and engage or disengage other keyboard functions. In step 850 the keyboard can communicate debugging options to a user by flashing lights that correspond with light tests, haptic tests, audio tests and/or keyboard feel tests. After a user depresses a particular key, the keyboard can execute the debugging algorithm in step 855 to assist the user in indemnifying issues with the keyboard. For example, the keyboard can notify the user that it is entering a light test mode by powering all of the lights to a white color for five seconds.

In step 860 the user can depress a key that notifies the keyboard processor that the debugging is complete. In one embodiment the user can signify this by depressing the "End" key and the keyboard can either exit the debugging function or go back to step 820. In further embodiments the debugging operation can enable debugging of a separate peripheral device via the keyboard. In one example a headset that is collocated with the keyboard or that is coupled to the keyboard may be debugged through the debugging routine described above. In one example the keyboard can command the collocated peripheral device to illuminate certain colors to determine if the lights work on the peripheral device.

After step 865, the keyboard is in a system reset mode in which a user can reset one or more memory storage locations of the keyboard. In one example a keyboard may have four separate key remapping memory locations in which remapping configurations are stored, however the keyboard can have any number of memory locations. Once in this mode the user can select which memory location they would like to reset by depressing only that particular key, for example M1. In step 870 the processor can transmit a confirmation to the user before resetting. For example the keyboard can flash lights at the user or display an alphanumeric message to the user such as, for example, "Y or N". In step 875 the keyboard receives confirmation from the user, for example the user can depress the "Y" key. In step 880 the processor can reset the memory location corresponding to M1 and in some embodiments can display a confirmation such as shown in FIGS. 7A-7G. In step 860 the user can depress a key that notifies the keyboard processor that the memory reset is complete. In one embodiment the user can signify this by depressing the "End" key and the keyboard can either exit the debugging function or go back to step 820.

In step 885 once the user has completed the administrative functions, the user can depress an "End" key to exit the administrative function. In step 890 the processor can exit the administrative mode.

It will be appreciated that method 800 is illustrative and that variations and modifications are possible. Steps described as sequential may be executed in parallel, order of steps may be varied, and steps may be modified, combined, added or omitted. For example, a keyboard may not have an administrative mode and may have separate configuration modes, debugging modes and/or system reset modes that can each be accessed individually without going through an administrative mode. In another example, the administrative mode may also include a pairing setup function in which pairing information can be changed or reset such that an order of wirelessly or otherwise paired devices can be cycled through, altered or removed. In an additional example, the administrative ode may also provide information on a MAC address, IP address, etc. of a paired device or another device.

In an additional embodiment, the keyboard can be used to debug a separate peripheral device (e.g., a mouse, foot pedal, steering wheel, headphones, speakers, wheels, joysticks, etc.). The keyboard can communicate with the separate peripheral device directly or via a host computer. The peripheral devices can be coupled via wireless or wired connections and in one embodiment a USB cable may be used to couple the two peripheral devices. In some embodiments, a certain key command combination either on one peripheral device or between the two peripheral devices can be used such that the keyboard (which has many keys/lights) can be used to debug, for example, a mouse (which has relatively few keys/lights). The mouse may have profile adjustable keys, scroll wheels, lights, haptics, etc. that can be changed via the keyboard. In one example, a memory of the mouse could be reset to a factory default or other image that may be stored on the mouse or keyboard. A debugging mode between connected peripheral devices can be indicated through, for example, a shared light schema, a message displayed on the keyboard (e.g., lighting up the keys of the mouse or the like) through the host or through any other communicative method described herein.

As would be appreciated by one of skill in the art having the benefit of this disclosure, the keyboard communication functions described above are for example only and any combination of depressed key combinations, lights, haptics and/or audible sounds can be used, including all of those described within this disclosure. In some embodiments the profile of the braking applied to a key can be changed to determine if there is an issue with the keyboard itself or if the issue is with the host device not sending a correct command. This same concept can be used to debug a haptic enabled or profile alterable scroll wheel, brake pedal, steering wheel, etc.

As would be appreciated by one of skill in the art having the benefit of this disclosure, any of the key remapping and/or administrative functions described herein can be performed by the host in place of, or in addition to being performed by the keyboard. More specifically, in one embodiment, while the keyboard can be configured independent of the host computing device, the host computing device can be used to configure the keyboard and in particular can be used to remap one or more keys, reconfigure one or more keyboard options, debug one or more functions of the keyboard and/or reset memory locations within the keyboard. In some embodiments a host computing device can be configured using software or an application program to display a graphical user interface (GUI) to the user. The user can control the keyboard via the GUI to perform any of the remapping functions described by FIG. 5 and/or any of the administrative functions described by FIG. 8. For example, a user could set up a new key remapping configuration by clicking on icons within the GUI and could then store the remapping configuration in the keyboard memory. In some embodiments, when being programmed by the host, the keyboard may communicate with the user using the same lighting, audio and/or haptic responses, while in other embodiments the keyboard may not communicate with the user.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer keyboard comprising:
   a housing;
   a communication module coupled to the housing, the communication module configured to communicatively couple the computer keyboard with a host computer;
   a plurality of keys coupled to housing, the plurality of keys configured to be physically actuated by a user of the computer keyboard; and
   one or more processors disposed within the housing, the one or more processors configured to:
   in response to physical actuation of one of the plurality of keys, cause a respective one of a plurality of signals to be transmitted to the host computer via the communication module;
   enable key remapping of any of the plurality of keys such that a different one of the plurality of signals can be transmitted in response to actuation of any of the plurality of keys;
   store the key remapping in a memory location within the keyboard; and
   (1) regardless of whether the plurality of keys are remapped and (2) in response to a predetermined pattern of actuation of a combination of the plurality of keys, cause the keyboard to enter an administration mode, wherein, while in the administration mode, the one or more processors modify operation of the keyboard in response to actuation of one or more keys of the plurality of keys.

2. The keyboard of claim 1 further comprising lights that indicate the keyboard is in the administration mode.

3. The keyboard of claim 1 wherein the one or more processors activate a lighting scheme that indicate which of the plurality of keys can be used to modify operation of the keyboard.

4. The keyboard of claim 3 wherein the lighting scheme forms an alphanumeric message displaying information corresponding to use of the administration mode.

5. The keyboard of claim 1 wherein the administration mode includes a function that resets remapped keys of the plurality of keys to a default state.

6. The keyboard of claim 1 wherein the administration mode selectively allows the memory location to be reset to a default state.

7. The keyboard of claim 1 wherein the keyboard communicates to the host computer a status of the remapping.

8. The keyboard of claim 1 wherein the administrative mode includes selective activation of one of a plurality of haptic devices of the keyboard.

9. The keyboard of claim 1 wherein the administrative mode enables debugging of a different peripheral device collocated with the keyboard.

10. The keyboard of claim 1 wherein the one or more processors communicate with the host computer while in the administrative mode to provide information to a user.

11. A peripheral device comprising:
a housing;
a communication module coupled to the housing, the communication module configured to communicatively couple the peripheral device with a host computer;
a plurality of keys coupled to housing, the plurality of keys configured to be physically actuated by a user of the peripheral device; and
one or more processors disposed within the housing, the one or more processors configured to:
in response to physical actuation of one of the plurality of keys, cause a respective one of a plurality of corresponding signals to be transmitted to the host computer via the communication module;
remap at least one of the plurality of keys such that physical actuation of a different one of any of the plurality of the signals can be transmitted to the host computer in response to physical actuation of any of one the plurality of keys;
store the remap of the at least one of the plurality of keys in a memory location within the peripheral device; and
(1) regardless of whether at least one of the plurality of keys are remapped, and (2) in response to a predetermined user input into the peripheral device, cause the peripheral device to enter an administration mode, wherein, while in the administration mode, the one or more processors enable the user to control features of the peripheral device that can only be accessed while in the administration mode.

12. The peripheral device of claim 11 wherein the at least one of the plurality of keys is a key of a keyboard comprising a plurality of alphanumeric keys and wherein the predetermined user input comprises the user physically actuating a predetermined combination of the plurality of alphanumeric keys.

13. The peripheral device of claim 11 wherein the administration mode enables the user to change configuration settings of the peripheral device.

14. The peripheral device of claim 13 wherein the configuration settings include enabling one or more haptic devices of the peripheral device.

15. The peripheral device of claim 11 wherein the administration mode enables the user to reset the memory location to a factory default.

16. The peripheral device of claim 11 further comprising a plurality of lights and wherein the one or more processors activate a predetermined combination of the plurality of lights in response to the peripheral device entering the administration mode.

17. The peripheral device claim 16 wherein the predetermined combination of the plurality of lights forms an alphanumeric message to the user.

18. The peripheral device of claim 16 wherein the at least one of the plurality of keys is a key of a keyboard comprising a plurality of alphanumeric keys and wherein each of the plurality of lights is associated with a key of the keyboard.

19. The peripheral device of claim 11 wherein the one or more processors communicate a status of the remapping to the host computer.

20. The peripheral device of claim 11 wherein the one or more processors communicate with the host computer while in the administrative mode to provide information to a user.

* * * * *